(12) United States Patent
Lopez et al.

(10) Patent No.: US 8,150,371 B2
(45) Date of Patent: Apr. 3, 2012

(54) INTERACTIVE CONTROL OF ACCESS TO SERVICES AND CAPABILITIES OF A MOBILE DEVICE

(75) Inventors: Ricardo Jorge Lopez, San Marcos, CA (US); Craig Lauer, San Diego, CA (US); Richard Doil Lane, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 617 days.

(21) Appl. No.: 11/743,833

(22) Filed: May 3, 2007

(65) Prior Publication Data

US 2008/0274765 A1    Nov. 6, 2008

(51) Int. Cl.
*H04Q 1/00* (2006.01)
(52) U.S. Cl. .......................... 455/411; 455/410
(58) Field of Classification Search .................. 455/411, 455/403, 410, 409, 449, 451, 550.1, 414.1, 455/414.2, 417; 709/225, 229, 230, 237; 705/43, 69, 67
See application file for complete search history.

(56) References Cited

U.S. PATENT DOCUMENTS

| | | | | |
|---|---|---|---|---|
| 5,517,554 | A * | 5/1996 | Mitchell et al. | 455/411 |
| 6,662,023 | B1 * | 12/2003 | Helle | 455/558 |
| 7,136,645 | B2 * | 11/2006 | Hanson et al. | 455/435.1 |
| 7,174,189 | B1 * | 2/2007 | Chen et al. | 455/554.1 |
| 7,184,750 | B2 * | 2/2007 | Tervo et al. | 455/410 |
| 7,251,474 | B2 * | 7/2007 | Engstrom et al. | 455/411 |
| 7,400,878 | B2 * | 7/2008 | Hassan et al. | 455/410 |
| 2003/0196087 | A1 | 10/2003 | Stringer et al. | |
| 2004/0205164 | A1 * | 10/2004 | Jacobs et al. | 709/219 |
| 2005/0079863 | A1 * | 4/2005 | Macaluso | 455/419 |
| 2005/0132348 | A1 * | 6/2005 | Meulemans et al. | 717/168 |
| 2005/0245236 | A1 * | 11/2005 | Servi et al. | 455/411 |
| 2006/0168200 | A1 * | 7/2006 | Goldberg et al. | 709/224 |
| 2007/0021127 | A1 * | 1/2007 | Zheng | 455/456.1 |

FOREIGN PATENT DOCUMENTS

| | | |
|---|---|---|
| JP | 2004007589 A | 1/2004 |
| JP | 2005079996 A | 3/2005 |
| JP | 2005311462 A | 11/2005 |
| JP | 2006505226 A | 2/2006 |

(Continued)

OTHER PUBLICATIONS

International Search Report—PCT/US08/062252, International Search Authority—Apr. 12, 2008.

(Continued)

*Primary Examiner* — Jean Gelin
(74) *Attorney, Agent, or Firm* — Gerald P. Joyce, III (57) ABSTRACT

A system device and method are provided which determine authorization for access to one or more services grouped together as a package of services without direct intervention of a wireless network provider or wired network access provider. This offers business proprietors, contractors for telecommunication services, service resellers, OEMs and service providers the ability to authorize users, particularly users of mobile communication terminals, hereafter referred to as the "Owner," access to package services. In this way a large package of features and applications can be available to a mobile device, but access to those features and applications can be controlled by the Owner thus providing the Owner with control over expenses related to accessing those features and applications. It also provides the Owner the ability to secure and prevent unauthorized access to features and applications which could allow an unauthorized user access to sensitive data and equipment.

17 Claims, 10 Drawing Sheets

| FOREIGN PATENT DOCUMENTS | | |
|---|---|---|
| RU | 2292668 C1 | 1/2007 |
| WO | WO20040036941 | 4/2004 |
| WO | 2004057485 | 7/2004 |
| WO | WO2005062657 | 7/2005 |
| WO | WO2006013958 A1 | 2/2006 |
| WO | 2006099239 | 9/2006 |

OTHER PUBLICATIONS

Written Opinion, PCT/US2008/062252, International Search Authority—Apr. 12, 2008.

* cited by examiner

INTERACTIVE CONTROL OF ACCESS TO SERVICES AND CAPABILITIES OF A MOBILE DEVICE

BACKGROUND

The use of wireless communications systems is well known for transmitting information between fixed stations and one or more geographically dispersed mobile receivers. For example, satellite communications systems have been used in the trucking industry for years to provide messaging and location information between fleet owned dispatch centers and their respective tractor-trailer vehicles. Systems exist were a company, hereinafter referred to as a contractee, provides equipment and services which incorporate wireless telephone services. The contractee can bundle equipment and services, including value added applications and/or products and provide, resell, lease or rent them to employees, customers, contractors, etc.

The contractee may wish to limit the availability of certain ones of the bundled services. Until now, no system or method allowed contractee control of access to bundled services. Up till now, this control was always held by the telecommunications service provider.

Phone service providers generate much income through providing services to user mobile stations (MS) which route traffic through a mobile switching center (MSC). The MSC provides services and coordination between mobile users and external communications networks. This backbone switch is also a primary billing vehicle of a telecommunications service provider allowing a range of billing schemes based on time of day, demand, volume of data, etc. A need exists to allow mobile communications users, particularly those associated with fleet communications, to control costs and access to certain systems such as ring back tones, three-way calling, call waiting, voice mail, etc. while avoiding the costly billing of the phone company's MSC.

There has been a long-standing trend toward distributed processing. For instance, attempts are underway to avoid the MSC—the central telco switch. The MSC is problematic for many reasons. For instance, it typically takes up space on many floors; it has to be cooled, etc. Attempts have been underway to make a packet switch with distributed processing. In this manner, attempts have been made to reduce the footprint (e.g., power consumption, size, computing requirements) while trying to increase processing capacity. Reducing the footprint currently is addressed by spreading functionality over several switches. For instance, it is now common to use what are referred to as intelligent peripherals. As an example, some telecommunications companies handle call traffic by routing calls to one city several hundred miles from base stations connected by fiber optics in another city through a central station. As the trend toward distributed switches and switching continues even functions such as the Home Location Register (HLR) and Visiting Location Register (VLR) that used to be a part of the MSC are now located separate from the MSC.

A need exists to allow business owners, equipment rentals, etc. to control of access to features by mobile communications equipment such as mobile phones, etc. A need also exists to control of access to features to mobile equipment in an environment with a reduced footprint.

BRIEF DESCRIPTION OF THE DRAWINGS

Applicable reference numerals have been carried forward.

DETAILED DESCRIPTION

In one preferred embodiment, a system determines authorization for access to one or more services grouped together as a package of services (hereinafter referred to as a package). The package of services replicate the vertical features of a conventional mobile switching center (MSC) which is a telecom switch that provides coordination of call setup and telecom services. The system offers business proprietors, contractors for telecommunication services, and service providers the ability to authorize users, particularly users of mobile communication terminals, access to package services. The implementation of the aforementioned system may be accomplished in one aspect using a mobile feature control application daemon operable in an embedded operating system within a mobile station (MS). The MS as referenced herein may include a mobile phone, a smart phone, a personal digital assistant with wireless capabilities, a desktop computer, a portable computer (e.g., laptop or notebook computer) with wireless capability (802.11 local area network connectivity (e.g. WiFi)), a pager or other personal communications device.

Figure 1:
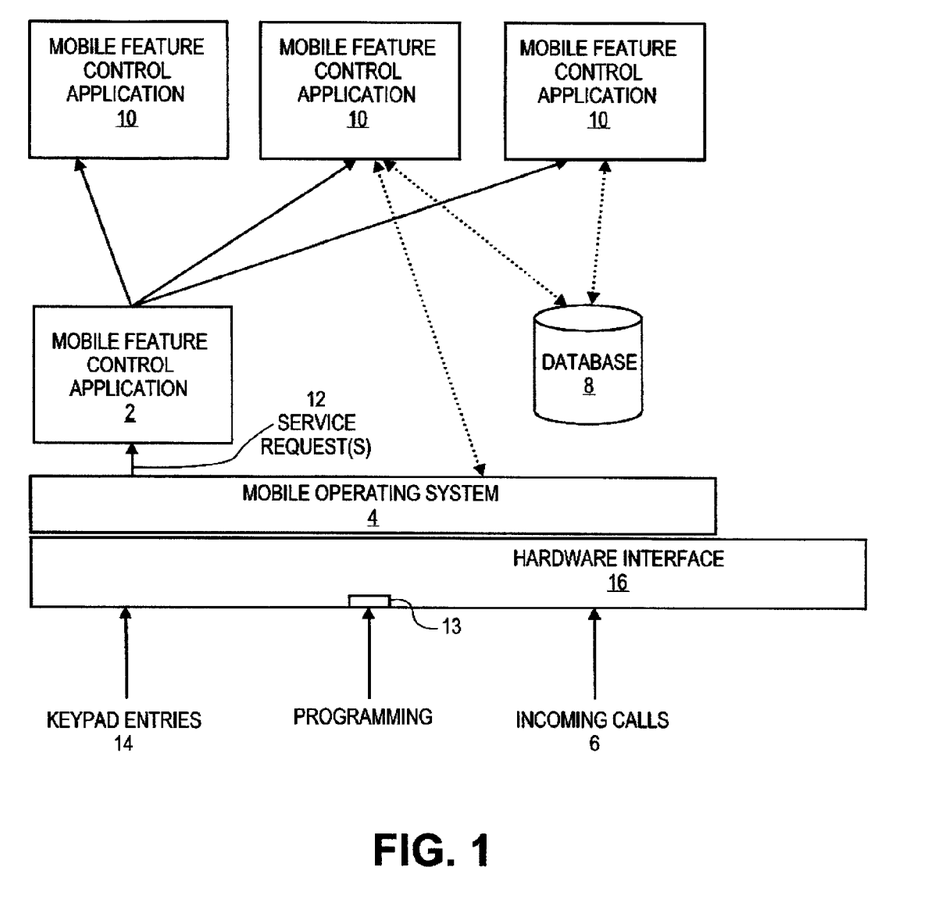
FIG. 1 is a diagram depicting the interaction of processes, such as a parent process known as Mobile Feature Control Application (MFCA) within a mobile station (MS).

FIG. 1 is a diagram depicting the interaction of processes, such as a parent process known as Mobile Feature Control Application (MFCA) 2 within a MS. MFCA 2 listens on a port for service requests 12 from Mobile Operating System (MOS) 4. For instance, in connection with receiving a service request which results from an incoming command/call 6 to update (modify or control) a feature list (not shown) in MFCA database 8, MFCA 2 spawns (as indicated by the arrows from 2 to 10) a MFCA child process 10 in response to service request 12 initiated by a user or program action. Similarly, more service requests 12 may result in spawning MFCA child processes 10 as show in FIG. 1. As a consequence thereof, multi-process handling of incoming service requests may be provided. In one aspect, another type of service request may result from MS entries 14, e.g. keypad entries (e.g., dialed digits or other ways of entering digital data via keyboard, voice command, biometric indicator, etc.) through hardware interface 16. In this aspect, MFCA child 10 checks (as indicated by double ended arrows from 10 to 8) the incoming keypad entries 14 against the allowed features defined in the MFCA database 8. Presently, this type of functionality is usually defined and implemented on an associated Message Switching Center (MSC) (not shown). Alternatively, the database or a portion of it could be downloaded to the MS and an authorization may be proxied to MFCA 2, MFCA child process 10 or some other process on the MS for one or more desired features.

Database 8, in one aspect, may include extended markup language (XML) files. Alternatively, database 8 may include other computer language files such as wireless markup language (WML) files, Practical Extraction and Report Language (Perl) files. Binary Runtime Environment for Wireless (BREW) application (app) files, Executables (.EXE files), Java ARchive (JAR) files, Java 2 Platform, Micro Edition (J2ME) files, C++ files, C files, or many more other types of files depending on feature, service, operating system (OS) etc. The files within database 8 may include information pertaining to what services, features, conditions of use, algorithms for determining use, programs, scripts, etc., are made available to the holder of the phone from, for instance, the phone owner, business proprietor, contractor for telecommunication services, or service providers as the case may be. The services or features may relate to information entered in the phone such as biometric data, voice commands or dialed digits (e.g., via keypad), or incoming information transmitted from a remote location such a calls or messages (e.g., short message service (SMS).

In one preferred embodiment, MFCA 2 listens on a port for service request 12 through mobile operating system (MOS) 4. Any mobile operating system that has a multi-threaded multiprocessing architecture may be sufficient. For instance, Symbian™, Win CE™, Rex™, VxWorks™, ThreadX™, or Nucleus™, to name a few, are examples. A well known operating system such as Symbian™ may be employed. However, in one aspect, MOS 4 is modified to cause all service requests 12 to be sent to MFCA 2. For instance, authorization from the MFCA prior to feature use might be local to the MS and use an algorithm/script etc. . . . which was downloaded earlier. MFCA 2 in turn spawns a child process, MFCA 10, that verifies that the service requested authorized for the user of the MS. For instance, in a case where a service request occurs in conjunction with dialed digits from MS user entries 14, MFCA 10 checks database 8 to determine whether the request is supported by the MS. Child process MFCA 10 accesses database 8 using a XML or WML command call that may, for instance be named "MobileFeatures.MFCA(feature_type, . . . ) corresponding to a MFCA class. Additional methods may be defined as enhancements to provide features on the MS as specified by a fleet owner, etc. For instance, the service request may be for the MS to gain access to SMS messages, Location Based Services (LBS), Call Waiting (CWT), roaming services or any number of other services. The suite of accessible services may be customized on an MS basis, user, location, time or other algorithm thereby controlling access to services on a case by case basis according to given criterion/criteria. Moreover, a provider of services such as a company owner, phone rental service, etc., may service access on a customer, contractor, employee, etc. basis. Services made available to an MS may be added, modified, or deleted through programming port 13 in hardware interface 16. Programming services/features into an MS may occur in connection with data sent wirelessly to a mobile station from for instance, a fleet owner, MS rental agency, business owner, etc.

Figure 2:
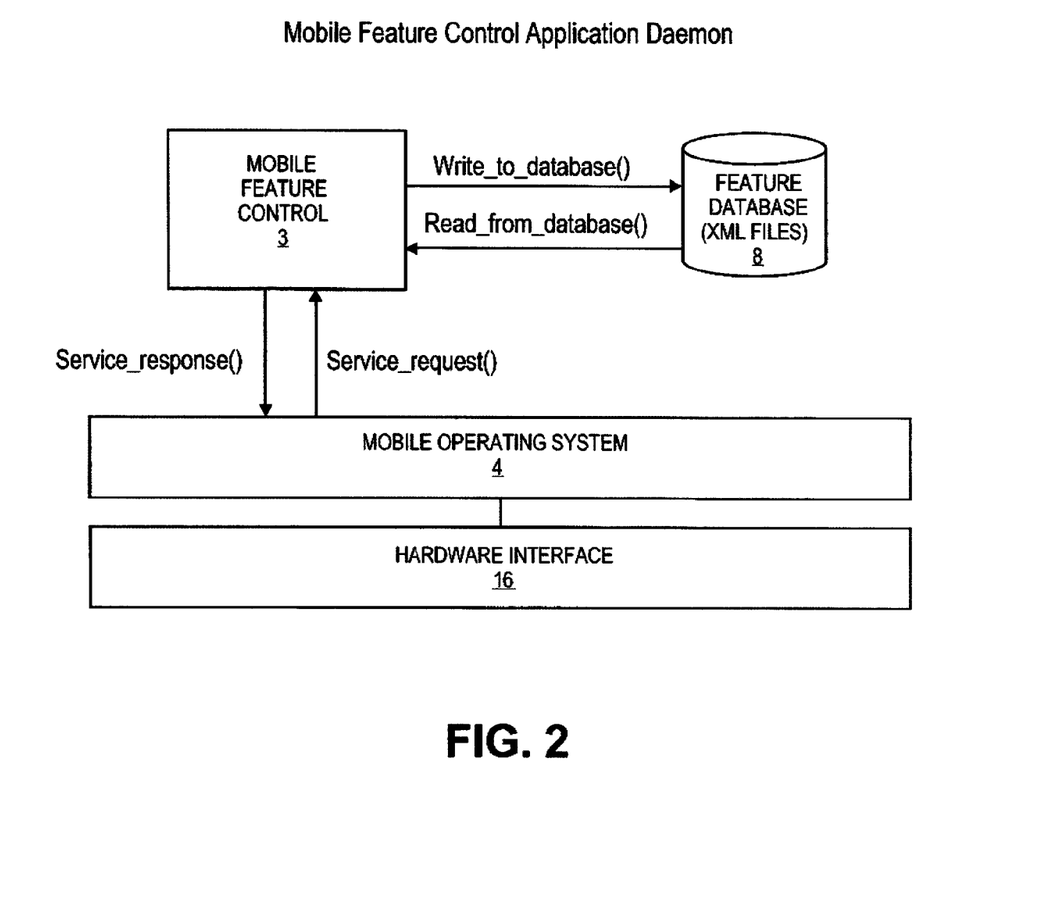
FIG. 2 illustrates the mobile feature control application daemon.

FIG. 2 illustrates the mobile feature control application daemon. MFCA 2 and its spawned application, MFCA 10, as shown in FIG. 1, are included within mobile feature control 3. MOS 4 handles the operation of a MS. The features and functionality capable of implementation by a MS are downloaded to MOS 4 by, for instance, by an entity intended to control such functionality such as a fleet operator, business owner, etc. In one aspect, database 8 is updated with information indicative of whether a particular feature or functionality is authorized for MOS 4. Accessible features for a particular MS may be readily identified by checking the contents of its database 8. In another aspect, a MS may be provided with a complete or near complete set of features. However, the contents of database 8 (e.g., as specified through XML files), which may be programmed from a location remote from the MS, may determine which features carried out in conjunction with MOS 4 are available to the MS user. As indicated above, service requests (shown by the arrow from MOS 4 to Mobile Feature Control 3) may result from incoming calls (or messages) or MS user entries such as keypad entries through hardware interface 16. Such service requests are handled through MOS 4 (as indicated by the arrow from Mobile Feature Control 3 to MOS 4, so that incoming or outgoing signals from a MS indicative of a particular feature, e.g. three-way calling, voice mail, SMS messaging, etc., whether prompted by keypad strokes or incoming calls, are controlled through MOS 4, providing MOS 4 with the capability as a gate-keeper to available MS features. For instance, perhaps the requested functionality may be programmed into MOS 4. However, a given feature may only be available during certain times, e.g. over-seas calling after 9:00 p.m., etc. MOS 4 may cause a MS to display a message on the MS which indicates that a particular feature is not allowed in conjunction with denying access to particular feature that may be sought, for instance, through keypad strokes or buttons. Functionality may be easily programmed into a MS using a development kit that may be available for a mobile operating system. Additionally, a user might enable a function, feature, etc. through password authorization or by filling out a credit card payment page etc. . . .

In one preferred embodiment of this invention, control of services/features made available to a particular MS may be managed from a remote location using, for example, a web server with feature information embedded in web pages. For a set of Mobile Station (MS) owned by a small company or public agency, such as a police agency, access and control of available features/services may be configured via a secure website.

In one embodiment, an MS feature configuration may be managed via wireless methods using an Internet connection to a MS. This permits an embedded application to be downloaded to an MS.

Figure 3:
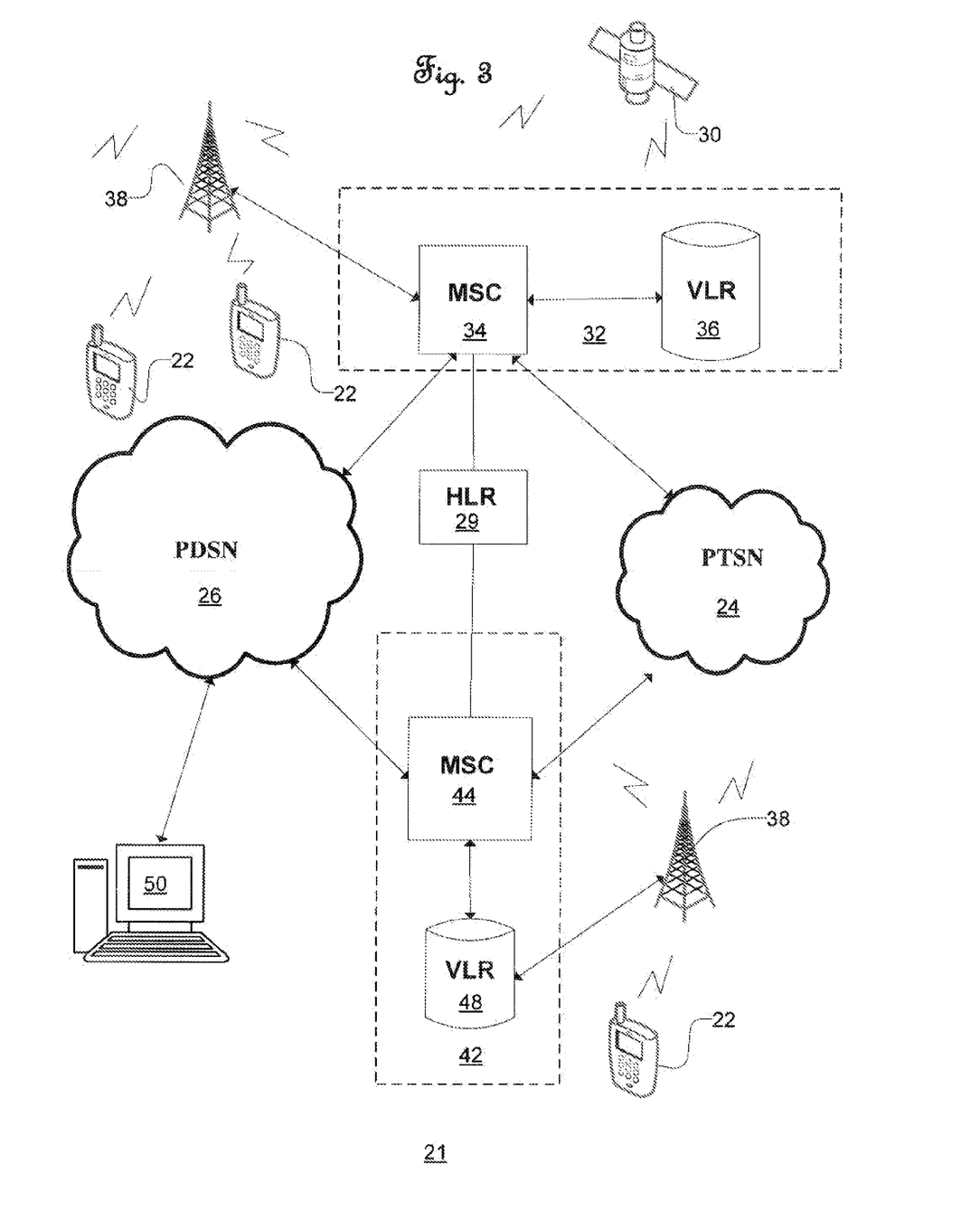
FIG. 3 illustrates a communication network including each MS being operable in accordance with that depicted by the diagram of FIG. 1.

FIG. 3 illustrates a communication network 21 including each MS 22 being operable in accordance with that depicted by the diagram of FIG. 1. Mobile switching center (MSC) 34 provides services and coordination between MS 22 and external networks such as public telephone switching network (PTSN) 24 and public data switching network (PDSN) 26 in connection with MS registrations on a Home Location Register (HLR) 29 and a Visiting Location Register (VLR) 36 in connection with roaming. Communication network 21 includes home system 32 which represents the system for which MS 22 is normally registered. Home system 32 includes MSC 34 and VLR 36. An MS 22 communicates over-the-air terrestrially via Base Station Controller (BSC) 38 connected to MSC 34 of home system 32. Home system 32 is connected to PTSN 24 and PDSN 26. Home Location Register (HLR) 29, which holds the registrations of MSs registered with home system 32, is connected to home system 32 and serving system 42. Serving system 42 includes MSC 44 and Visiting Location Register (VLR) 48. Home and serving systems 32 and 42, respectively, as well as third party networks (not shown) support and provide plain old telephone service (POTS), voice, data, and/or other services to MS(s) 22 over the entire communication network 21. Programming the accessibility of features available to MS 22 may be provided by through and/or from remote station 50 which may be operated by a fleet owner, business owner, equipment rental agency, etc. Remote station 50 may include data processing functionality such as a server and memory for maintaining control of MS feature accessibility.

Figure 4:
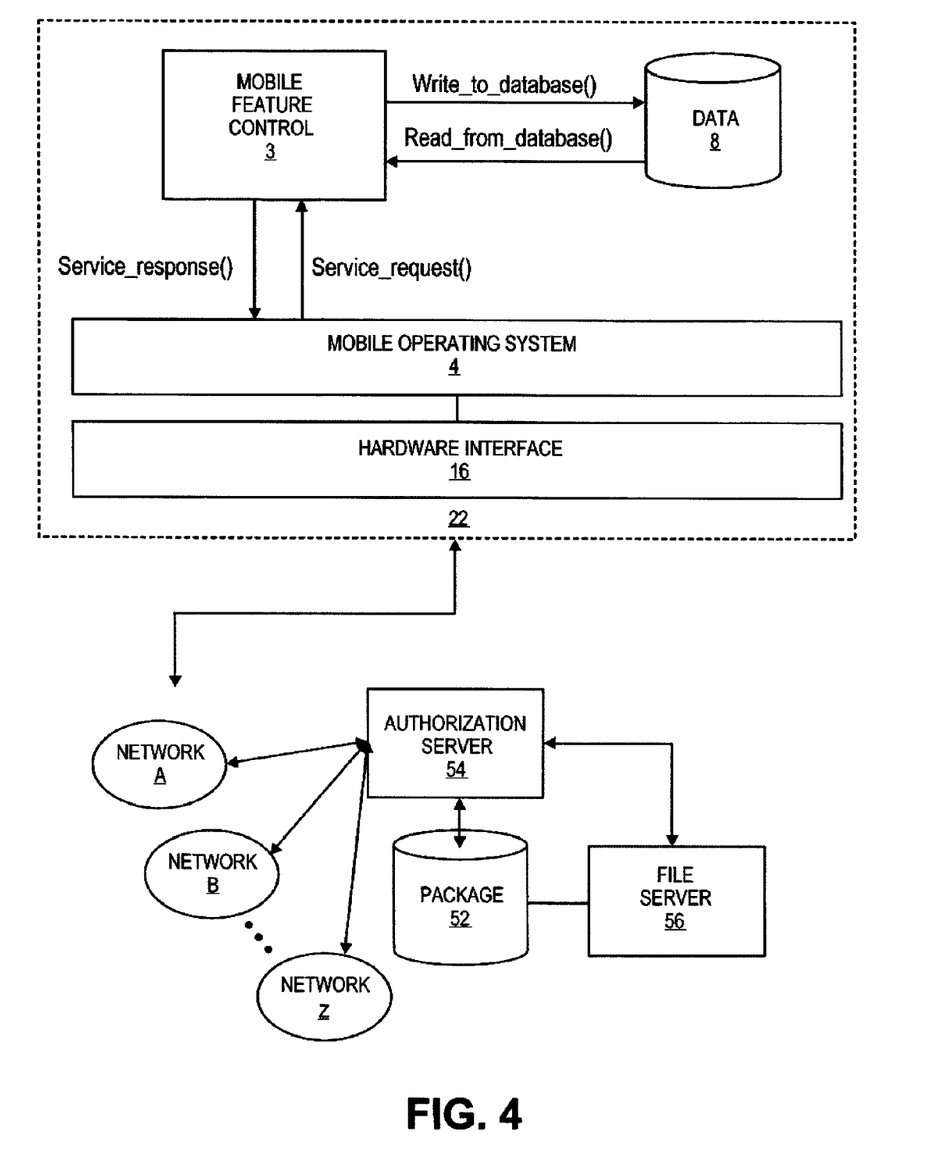
FIG. 4 illustrates a block diagram of one aspect of a preferred embodiment, wherein a package of services or service features is associated with a mobile communications terminal (MCT).

In another preferred embodiment, a system determines authorization for access to one or more services grouped together as a package of services (hereinafter referred to as a package). The system offers business proprietors, contractors for telecommunication services, and service providers the ability to authorize users, particularly users of mobile stations. A mobile station can comprise a mobile phone, a personal digital assistant with wireless capabilities, a portable computer with wireless capability, a pager or other personal communications device. With reference to FIG. 4, which illustrates a block diagram of one aspect of a preferred embodiment, package 52 is associated with mobile communications terminal (MCT) 22. Services available to MCT 22 from package 52 can be accessed through the provision of software files, codes, etc. from file server 56. Service providers may provide wireless and wireline service over one or more networks labeled with the appropriate wireless or wireline designation indexed, for example, by A through Z. Authorization server 54 either approves or denies access to a requested service, e.g. voice mail, conference calling, phone network update, etc. Authorization server 54 is ideally located with or under the control of a contractee offering bundled services. Authorization server 54 is programmed to evaluate requests from an MCT 22 for authorization to use one or more of the services and/or service features bundled in package 52. MCT 22 forwards requests to authorization server 54 through one of the wireline or wireless networks labeled A through Z. Wireless and wireline networks labeled A through Z may be intelligent and/or virtual networks. An intelligent network (IN) provides functionality to be flexibly distributed to a variety of network nodes both on and off of a network. Further, the architecture of the intelligent network may be modified to control the bundle of services in the package. A virtual network may be provided using ones of networks A through Z. A virtual network may be formed by primarily programming in, rather than hard-wiring, an extension of an existing network on an as needed basis. New, "intelligent" network nodes and special network components and also additional functions for extending existing exchanges are introduced into the network. The architecture of the intelligent network is obtained primarily from the operation of a service switching point (SSP), which is introduced as an extension of existing digital local or trunk exchanges, and of service control points (SCP) used as "intelligent" network nodes for setting up connections within.

Accessing authorization server 54 need not occur through an MSC. Consequently, in other embodiments, the path to authorization server 54 may occur through 802.11 (Wi-Fi), Ethernet virtual interface, Universal Serial Bus (USB), docking station, Ethernet cable, etc.

A user may be pre-authorized to access certain features, services, etc. both while in or out of contact with authorization server 54. This aspect is particularly useful for mobiles that will be executing customer or business proprietary features or services while outside of a cellular service area, e.g., geofence, data access, computer assisted repair, etc.

Figure 5:
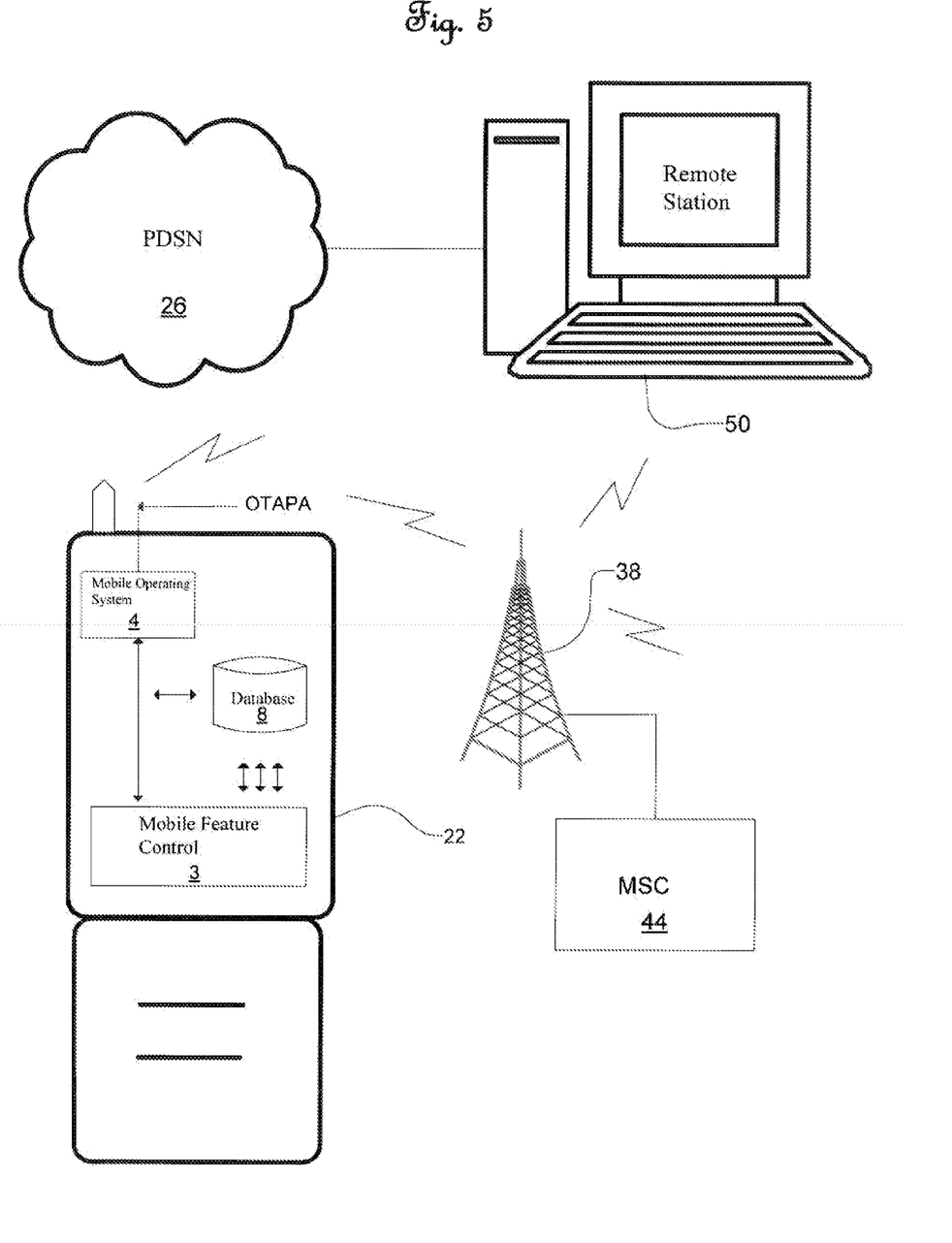
FIG. 5 illustrates a diagram of another aspect of a preferred embodiment wherein software files or code are downloaded to an MCT in response to a service request.

FIG. 5 illustrates a diagram further depicting the functionality of the mobile station feature control daemon within MS 22. In one preferred embodiment, MOS 4 may be modified with an application that is capable of receiving inputs from Mobile Switching Center (MSC) 44 via, for instance, Over-the-Air Parameter Administration (OTAPA) or OTASP using the IS-707 protocol. Mobile Feature Control (MFC) 3, as described herein, provides an interface to MOS 4 whereby services are verified with each request. If the requested service is not supported as indicated by a feature database then access to that feature is denied. MFC 3 accepts inputs from the MOS 4 that are marked as feature control data. This data is then stored in a feature database such as database 8.

It is contemplated that the MFC 3 may be provided via a downloadable software application. The mechanism for downloading the application to MS 22 may vary with the MS. For instance, in some cases, the MFC application will be downloaded from the telecommunications service provider.

In one embodiment, all dialed digits on MS 22 and service requests are sent to the Mobile Feature Control application (MFCA), not shown, within MFC 3. The MFCA then compares the requested service to the services allowed in the feature database 8. The features in database 8 are not accessible for changes by the user of the MS 22. The features can only be changed by an operator at remote station 50 having access to MS 22.

In other embodiments, in addition to using the mobile feature control application daemon described above, rather than accessing services and features through a MSC, which is typically owned by a telecom service provider, these features and services may be provided through a proprietary asynchronous transfer mode (ATM) network (or asynchronous transfer mode-like network) using the Internet. The ATM network capacity automatically adjusts to meet system needs and bandwidth is allocated on demand.

Figure 6:
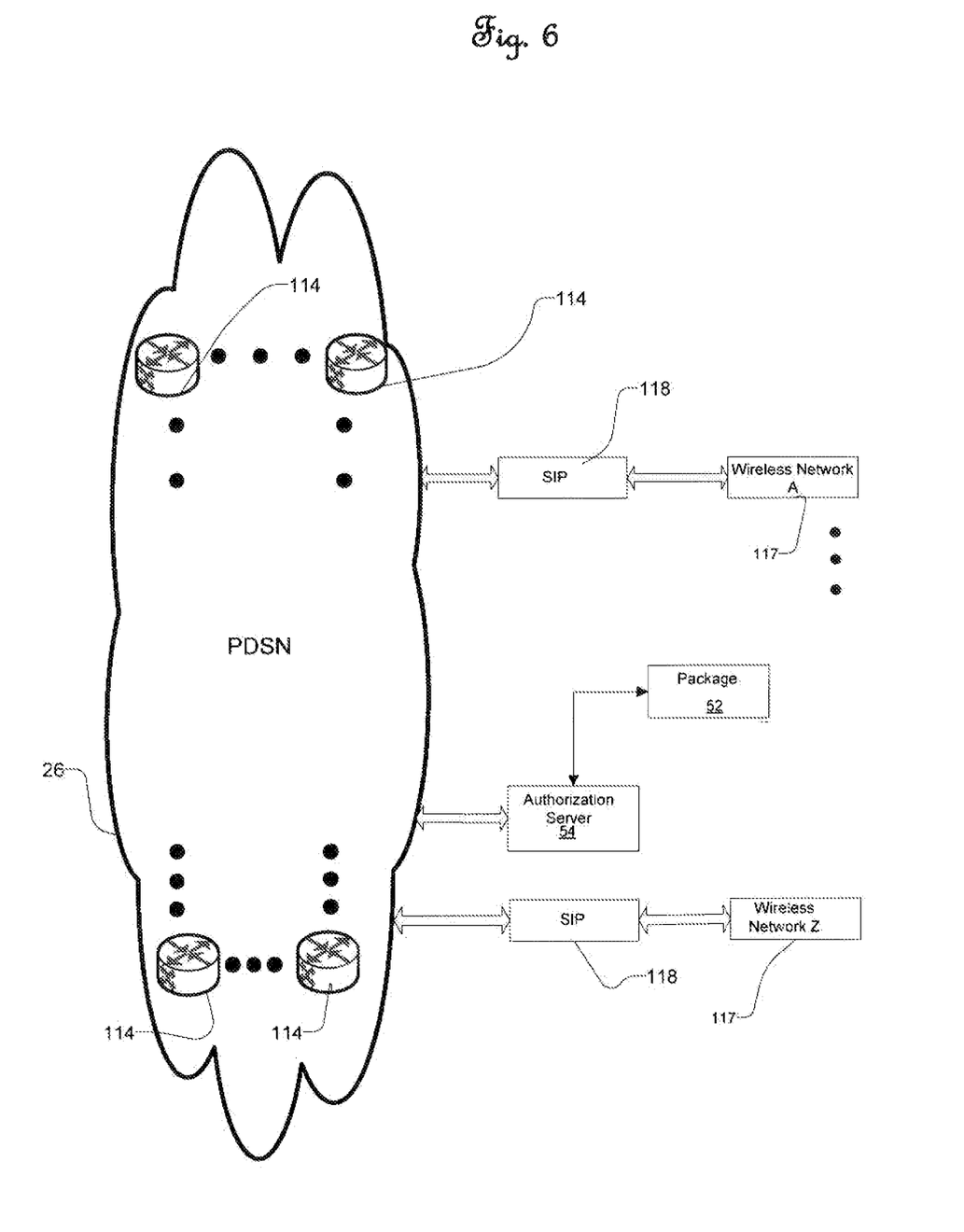
FIG. 6 illustrates a diagram showing a system view of one embodiment.

FIG. 6 illustrates a diagram showing a system view of one embodiment which may be used in conjunction with the mobile feature control application daemon described above. With reference to FIG. 6, packet switched data network (PDSN) 26 is used to connect ATM router(s) 114. For instance, ATM router connections may form part of a wide area network (WAN). Each ATM router 114 contains a route list which specifies the route path of a particular payload type of information. The payload information is formed from native data that an ATM router transfers into a fixed length sequence of data called ATM cells. Generally, an ATM cell is a set of data that is formed by an ATM switch or ATM router as that data enters an ATM network. Package 52 of services is accessed through authorization server 54 which hangs off the ATM network formed by ATM routers 114 which provide connections over the PDSN using the Internet. Control of services and features to a mobile station (not shown) may be controlled by daemon implemented in the mobile station and determined by an entity remote from the mobile station such as a business owner, etc. Data to and from wireless network 117 (e.g. networks A and Z as shown), in one embodiment, is provided through a Session Initiation Protocol (SIP) gateway 118. SIP is a protocol that allows communication between the Internet and a phone network such as a wireless phone network. For instance, an IP address may translate an IP address to a telephone number and vice versa. Further, SIP may be used as the vehicle that allows instant messaging over the Internet to a wireless phone network, providing bidirectional translation between a wireless phone network and a device connected to the Internet. In other embodiments, gateways based off of the H.323 protocol may be used.

Figure 7:
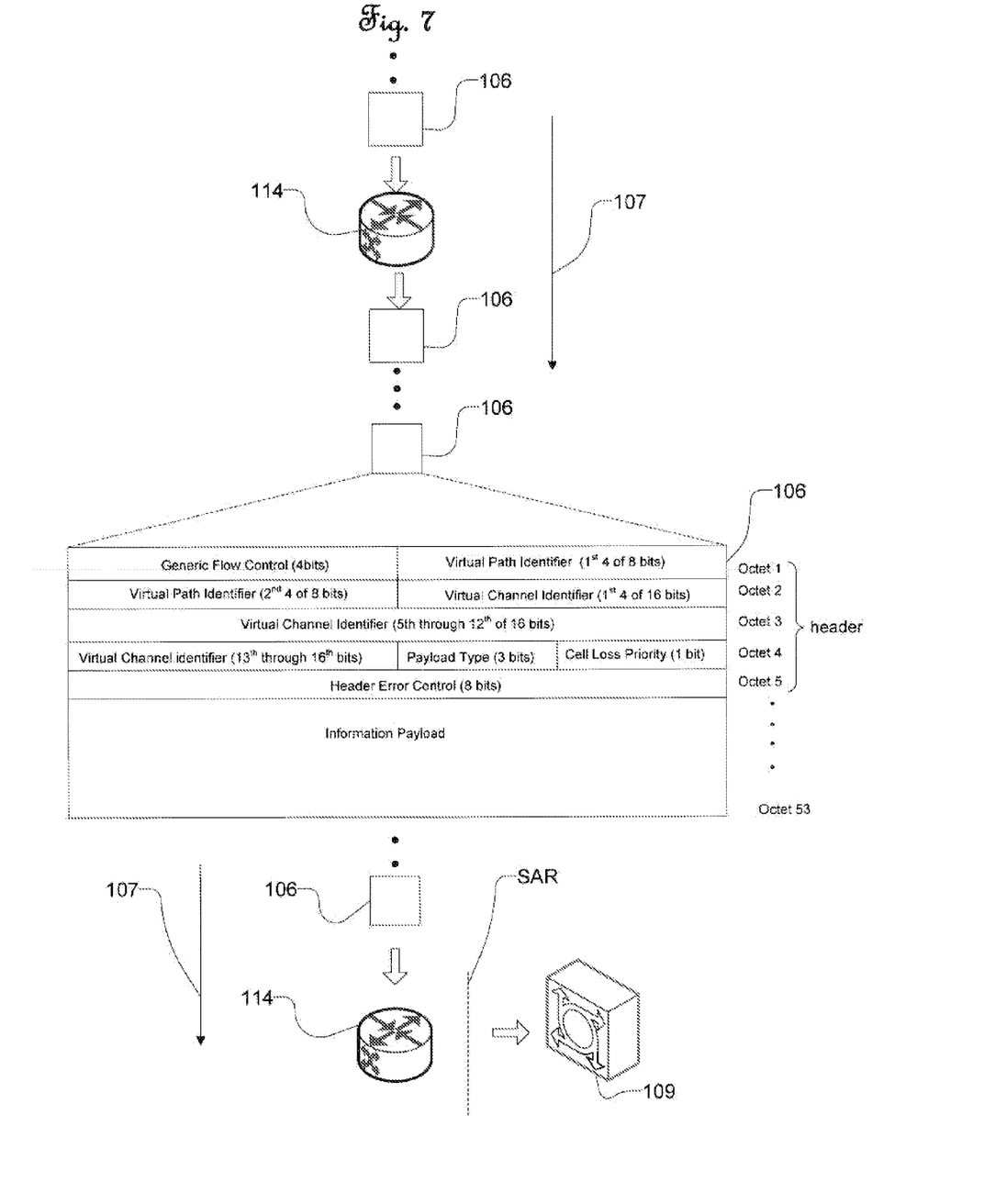
FIG. 7 illustrates ATM cell traveling along a virtual path through routers in an ATM to its destination.

FIG. 7 illustrates ATM cell 106 traveling along virtual path 107 through routers 114 with an ATM network to server 109, its destination. An exploded view of ATM cell 106 is also shown in FIG. 7. By convention, each ATM cell 106 contains 5 octets (an 8 bit byte) of header information followed by 48 octets of payload. The header (e.g., User-Network Interface (UNI) header format as shown or network-to-network header interface) includes several fields used by ATM routers and switches to properly route data and to guarantee the necessary quality of service (QoS). The header data identifies the cell, has a logical address that determines the routing, and includes priority and management bits. No error correction is provided beyond the header on the assumption that network traffic will not drop below an acceptable QoS. Information as identified by the Virtual Channel Identifier (VCI) and the Virtual Path Identifier (VPI) is routed to a particular destination specified by the route list for that type of data. The virtual channel is a single connection across a network that allows ATM cells to be switched to various destinations along virtual paths. ATM creates a fixed channel or route, between two points in connection with data transfer. ATM can be distinguished from, for instance, transmission control protocol/internet protocol (TCP/IP) wherein data is divided into packets and each packet can take non-fixed routes from source to destination. Consequently, whereas ATM cells specify a particular route from source to destination, TCP/IP can result in packets headed for the same destination to arrive at the destination via different routes. One advantage of ATM over TCP/IP is that the fixed route property of ATM makes it easier to track data and possibly bill for data transferred over a network as compared with TCP/IP. The VCI is a 16-bit field within each ATM cell and it defines the fixed channel on which the ATM cell should be sent. The VPI is an 8 bit field which indicates where an ATM cell is to travel over a network. ATM cells travel in streams through an ATM network in an asynchronous manner. The connection oriented nature of ATM allows a user of the ATM network to enter a stream when an ATM cell is available and not on the basis of fixed time slots. ATM networks typically transfer data at 155.52 and 622.08 Mbs. Cell are randomly assigned to a virtual channel (VC), as identified by the virtual channel identifier, and are multiplexed into the ATM network. Since large amounts of related data may be broken up and contained in more than one ATM cell, data in ATM cells 106 may be reassembled into its native format through a process of Segmentation and Reassembly (SAR), marked by the use of the dotted line shown, in connection with the cell leaving the network and arriving at server 109, its destination. In FIG. 7, features contained in or permitted through a package (not shown), such as ring back tones, three-way calling, call waiting, voice mail, instant messaging (text messaging), etc., which are normally associated with a MSC may be bypassed and handled through an ATM network, formed using router(s) 114, connected through the Internet. Traffic through a MSC provides a primary billing vehicle of a telephone service provider. By-passing the MSC and proceeding through the Internet may significantly reduce costs attributable to the traditional service provider. Further, quality of service issues may be addressed with more control. In addition to handling package features through an ATM network, the mobile feature control daemon described above allows control of features as specified by an entity such as a business owner, equipment rental agency, etc.

Figure 8:
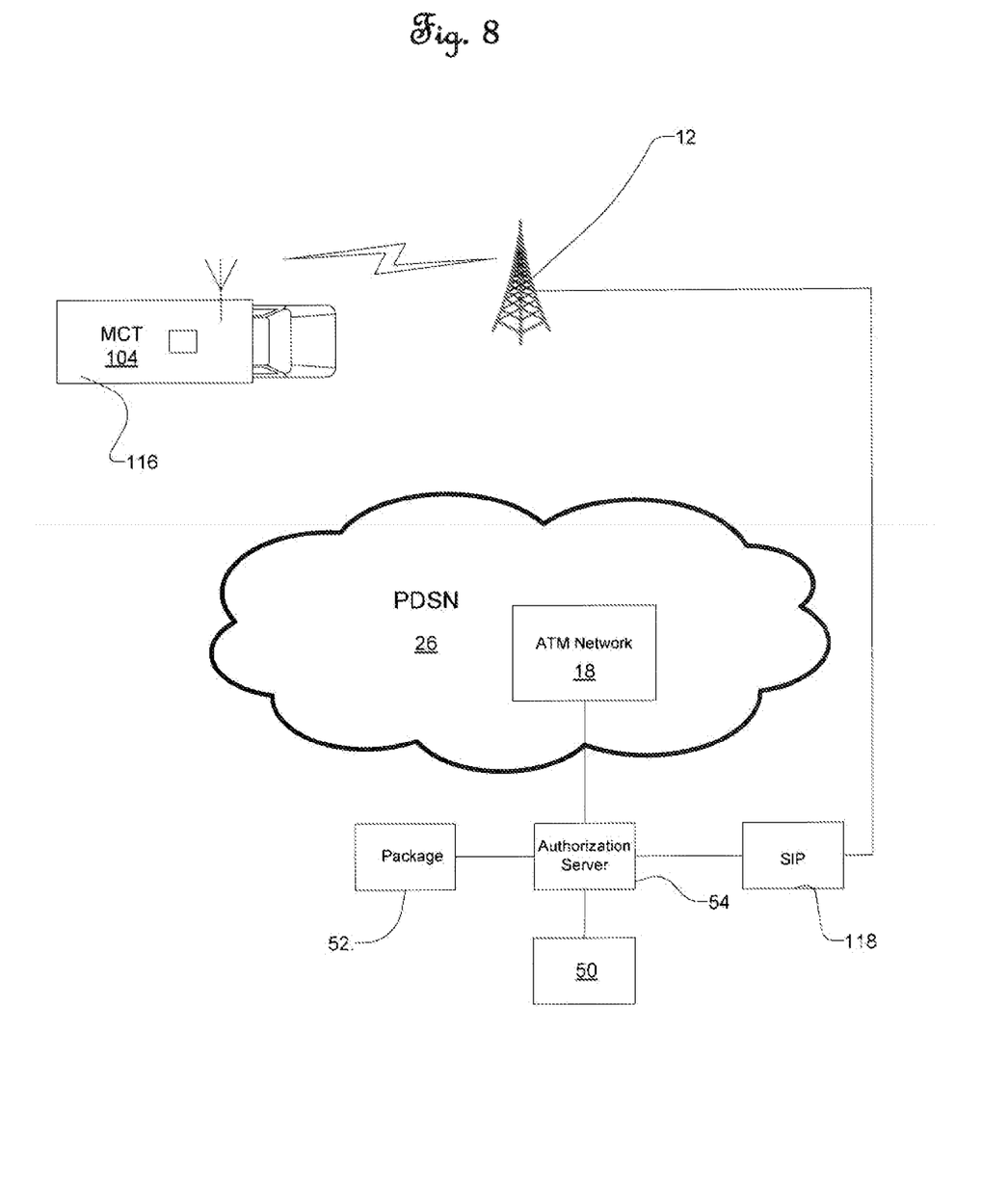
FIG. 8 illustrates a diagram of one embodiment showing a mobile communications terminal (MCT) carried by vehicle which may be operating in conjunction with a dispatcher controlling a fleet of vehicles.

FIG. 8 illustrates a diagram of one embodiment showing mobile communications terminal (MCT) 104 carried by vehicle 116 which may be operating in conjunction with a dispatcher controlling a fleet of vehicles. MCT 104 contains all of the functionality of MS 22 described above and shown in FIGS. 3, 4 and 5 including the feature control daemon. Services ("services" and "features" as used herein throughout are interchangeable and one includes the other) available to MCT 104 from package 52 can be accessed through the provision of data, software files, codes, etc. Package 52 may also include abilities, applications and services not typically controlled or billed by an MSC, wherein an owner or other party through authorization server 54 maintains control over the use and access of those abilities, applications and services. Authorization server 54 approves or denies a transfer of files, code etc. from package 52 in connection with a plethora of criteria, based on, for instance, the current location of the mobile communication terminal, the time of day, specific end user rights, etc. in addition to approved criteria or commands from remote station 50 (i.e., an entity controlling feature access). This allows remote station 50 the ability to change access rights for MCT 104 as needed and upon request. Ultimate access to services are determined by the feature control daemon (not shown) within MCT 104 as explained above regard to FIGS. 1, 2, 4, and 5. MCT 104 may contain (not shown) a receiver and transmitter, a communications interface such as a keypad for entering data (e.g. user identification data for package access), and one or more biometric sensors (for the purpose of identifying and/or authorizing users seeking access to a feature contained in package). A biometric sensor may be a fingerprint reader, a retinal scanner or a voice recognition device. MCT 104 may include a full complement of software which only requires activation or authorization from package 52 via activating software or completing software which is downloaded to MCT 104. Package 52, itself, may represent a server or one or more locations accessible through ATM network 18.

Figure 9:
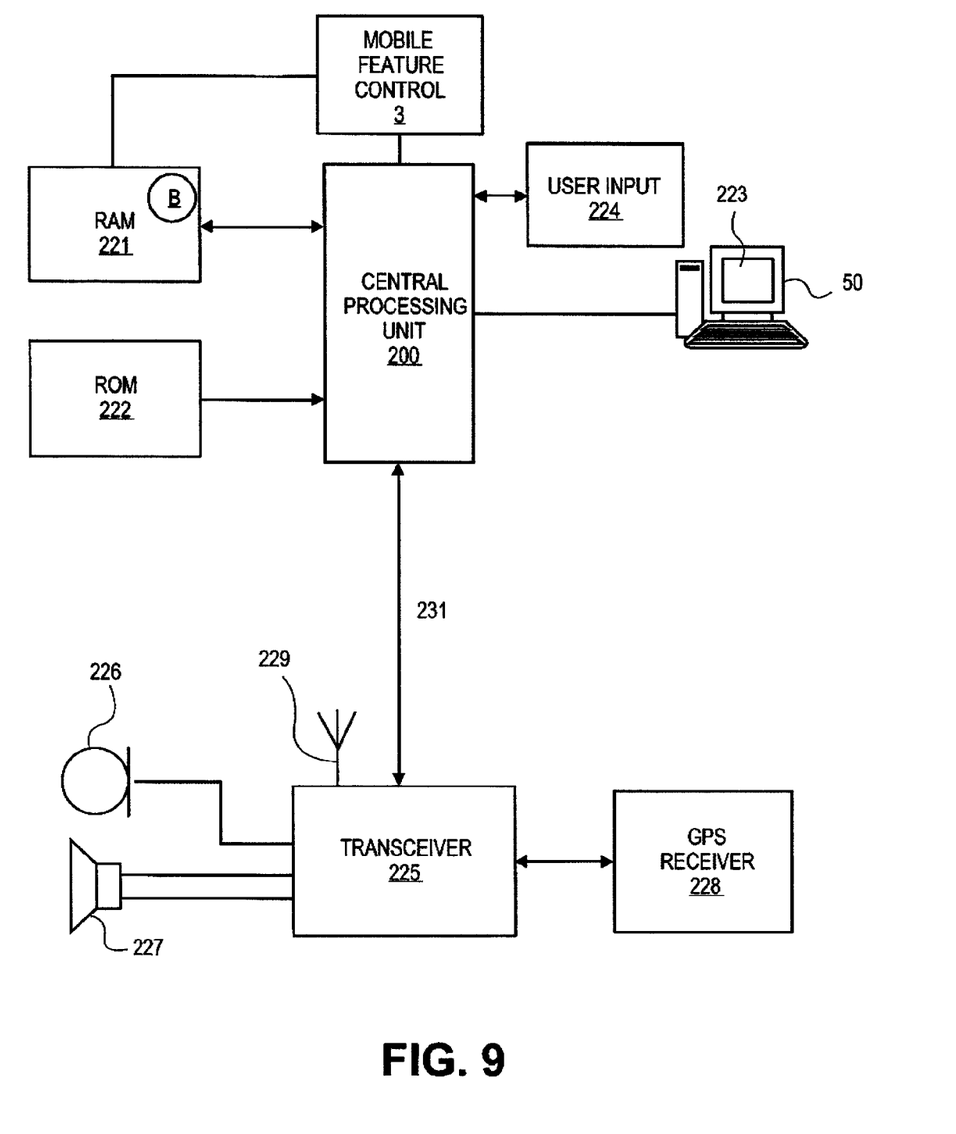
FIG. 9 illustrates a block diagram of an exemplary MCT.

FIG. 9 illustrates a block diagram of an exemplary MCT 104. MCT 104 includes central processing unit (CPU) 200, random access memory (RAM) 221, read only memory (ROM) 222, display 223, user input device 224, transceiver 225, microphone 226, speaker 227, Global Positioning System (GPS) receiver 228, and antenna 229. ROM 222 is coupled to CPU 200 and stores the program instructions to be executed by CPU 200. RAM 221 is also coupled to CPU 200 and it stores temporary program data. RAM 221 and ROM 222 may store selected portions of software necessary to implement a package 52 (FIG. 1) features. Access software or code downloaded from package 52 and made accessible through mobile feature control 3 implementing a feature control daemon, determine, in connection with programming CPU 200, a users' ability to use package features. Access and activation rights and other data may be processed by and/or through CPU 200 as gated by the feature control daemon functionality of mobile control feature 3. By having the necessary software (e.g., codes, programs, scripts or a portion of a program downloaded into RAM 221 or ROM 222) loaded at MCT 104, activation of a package feature or deactivation of a package feature can be done quickly, since either only a small amount code need be received in order to change access rights or simply, authorization need only be received in connection with use of the feature control daemon. User input device 224 may include a keypad, a touch pad screen, a track ball, etc. Should such codes, programs, scripts or portions of a program be present, a MFCA need not be accessed during standard operation of MCT 104. In this case, the code, program, etc. is authorized once, after which the downloaded code/program, etc. monitors itself during its predetermined lifespan. A user (not shown) employs input device 224 to navigate through menus, generate messages, request route information, and other functions. Display 223 is an output device such as a cathode ray tube (CRT), liquid crystal display (LCD), or other user perceptible device. The user may employ display 223 to read decoded messages or other data transmitted from a customer or other unit (such as another MCT) via wireless network 117.

In a preferred embodiment, feature access need not be realized through a code, program, script or portion of a program downloaded into a random access memory (RAM) or read only memory (ROM).

When provided, microphone 226 and speaker 227 may be incorporated in a handset coupled to transceiver 225. Microphone 226 and speaker 227 may also be more physically separated to enable hands-free communications with the user of MCT 104. In this mode, transceiver 225 may include voice activation circuitry that may convert voice into data which is forwarded to CPU 200 for processing. Data is transmitted to CPU 200 via serial bus 231. Transceiver 225 includes an instruction set necessary to communicate data and voice signals over a wireless network. In one embodiment, transceiver 225 supports code division multiple access (CDMA), wideband CDMA WCDMA), Universal Mobile Telephone System (UMTS), Global System for Mobile (GSM), Wi-Fi (Institute of Electrical and Electronics Engineers, Inc. (IEEE) 802.11), burst tolerance (BT), time division multiple access (TDMA), or Orthogonal Frequency Division Multiple Access (OFDMA) protocols. However other protocols such as time division multiple access and frequency division multiple access may be supported. The wireless network used supports both data and voice signals. Transceiver 225 is coupled to antenna 229 for communicating signals with wireless communication network 117 (shown in FIG. 6). When a data signal is received by transceiver 225, the received data is transferred to CPU 200 via serial bus 231. The data may include text messages, traffic updates, suggested changes to road navigation, destination, multiple destination order priority, weather, accident, construction or other road network status data, or other information. Use or ability to receive such data may be constrained by a users access rights to package 52 (FIG. 6). The data may also include software updates such as package access rights and authorizations for a particular user of MCT 104. Transceiver 225 may be capable of receiving position and velocity vector signals from one or more of a variety of position-location systems that are known in the art. In one embodiment, CPU 200 may also direct transceiver 225 to receive a GPS signal from a GPS satellite (not shown) and decode the GPS signal to extract position and timing information.

The downloaded data or code to MCT 104 may be used to enhance or add to package 52 features and functionality to MCT 104. For example, an entity controlling access to features of MCT 104 may cause the download of useful package 52 features such as accessories or updates to MCT 104. Alternatively, an entity controlling access may grant a user the ability to access subscription services that provide network based services that are useful in carrying out business, etc. Further, entertaining features such as images, screen savers, tunes, ring tones, games, or more may be made available to MCT 104.

Figure 10:
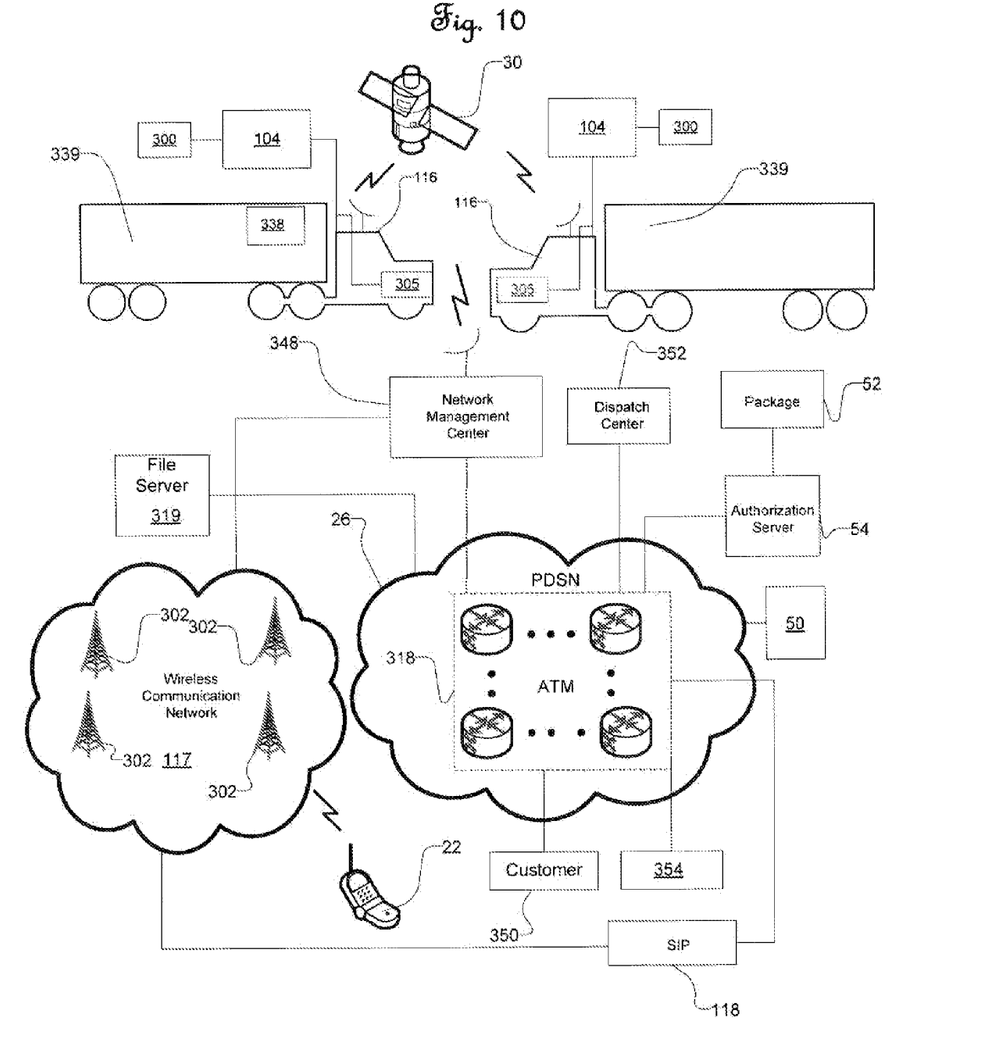
FIG. 10 illustrates a diagram of one embodiment, showing an MCT on a truck that can receive code or files downloaded front a package of features in conjunction with an authorization server.

Wireless equipment systems providing equipment management solutions, such as GlobalTRACS® by QUACOMM Incorporated, automatically collect, organize and transmit vital information concerning how equipment is being used, how much equipment is being used as well as the location of that equipment. This information is especially useful to entities renting, distributing, contracting or owning equipment-particularly construction equipment. An equipment management solution system can control equipment use. This type of information can be reported by a sensor tracking, for instance, usage hours and/or time of day use of a system or a piece of equipment. Further, the equipment management solution system may provide global positioning system (GPS)-based equipment location information including data indicating when a piece of equipment has moved outside of a pre-set boundary. For instance, authorization of use of equipment by certain operators may be of a more limited nature than others. With reference to FIG. 10, which illustrates a diagram of one alternative embodiment, the functionality of hardware/software 300 associated with MCT 104 on truck 116 representative of a piece of monitored equipment on truck 116 can be governed by code or files downloaded from package 52 in conjunction with authorization server 54. In one alternative embodiment, the code or files downloaded from package 52 occurs in connection with receipt of authorization from a feature control daemon in connection with authorization server 54 through a wireless communications network 117 that includes one or more base stations 302 and through ATM network 318. In addition to having feature access determined by access rights granted through a feature control daemon, it is contemplated that MCT 104 may also make requests for authorization to authorization server 54 or to remote station 50 (i.e., art entity controlling feature access) through ATM network 318. Downloaded codes and/or files may enable use of one or more services available to a user of MCT 104 in package 52 such as activation or configuration of sensor 305 for a particular purpose. This purpose may, for instance, serve to activate or deactivate a particular security device or alarm system. For instance, should a user of MCT 104 require additional programming codes or files to deactivate a security feature of sensor 305, then file server 319 may provide the required information through wireless communication network 117 in connection with authorization of a user through authorization server 54 through ATM network 318 connected through PDSN 26. Alternatively, MCT 104 can obtain, without the necessity to download additional files or codes, package 52 information through wireless communication network 117 and ATM network 318 to activate a function on sensor 338 of trailer 339. For instance, sensor 305 may receive information sufficient to allow activation or detection of security, safety or inventory related features.

Wireless communications network 117 may include a satellite network including satellite 30, a cellular telephone network or other wireless voice and/or data communications network. MCT 104 may be mounted in a vehicle or be part of a mobile device optimally geographically located within the operational boundaries of the wireless network 117.

With reference still to FIG. 10, network management center (NMC) 348 is coupled to a plurality of MCTs 104 via wireless network 117. NMC 348 acts as a central routing station for communications between MCTs 104 and one or more customers 350, dispatch centers 352, other designated office(s), shippers, consignees, governmental authorities, family members, (all shown generally designated by 354) etc. NMC 348 may be coupled to customers 350, dispatch center 352 and designees 354 by the Internet, dialup connection, wireless communication system, local area network or preferably through the Internet using ATM network 318. NMC 348 is coupled to wireless communication network 117 via wireless connections, dedicated communication lines such as T1 or T3 line, via a plain old telephone service (POTS) via the Internet or over the Internet through ATM network 18. Features from package 52 can be provided to the various entities coupled to NMC 348 in connection with access provided by authorization server 54. In another embodiment, NMC 348 is co-located with at least a portion wireless communication network 117. For example, NMC 348 could be co-located with a satellite earth transmission/reception station. The communication link between NMC 348 and MCT 104, is commonly referred to as a forward link, while signals from MCT 104 to NMC 348 are sent on a reverse link. Data communicated on the forward link may include geographical location information, delivery and vehicle status, encoded voice communications from another MCT 104 and directions, instructions, road status information, and voice communications from NMC 348. Further, package features can be provided to MCT 104 on the forward link. NMC 348 may cause the receipt of access information through feature control daemon 3 in MCT 104 as determined by entities such as customer 350 and/or dispatch center 352 (responsible for dispatching vehicles according to customer needs) and/or designee 354. In a preferred embodiment all communication needs are served while avoiding MSCs (not shown}, allowing communications to be more easily controlled and costs to be minimized.

One concept addressed by the foregoing involves reducing the time in connecting a call while requesting access from an authorization server. Switches are often judged by how many calls can be processed per hour. With increased call attempts, a service provider wants to start billing a customer as soon as possible. Billing generally starts at the time a call is connected. The foregoing described feature control daemon running as a background process in a mobile station (mobile communications terminal) can perhaps make billing happen sooner by allowing distributed, multiprocessing and parallel processing at the MS (MCT). For instance, at the same time a connection is being made to a MS (MCT), authorization from an authorization server may be simultaneously sought. Further, the daemon may be running during a call attempt and also simultaneously find the appropriate routes to complete the call as access to a service is being sought through a network.

In an alternative methodology, a user may request access to a particular feature. The request is routed to authorization server which may grant the users authorization to use the feature. Thereafter, a program, script, code, dynamic Link library (DLL) or partial program is downloaded to the mobile device (MS, MCT, etc.) which provides access to the desired service or feature, etc. From that point forward, there is no need for to involvement of an MFCA processor further request of an authorization server. Alternately, the program, script, code, dll or partial program may contain an internal disabler that deletes, suppresses or otherwise inhibits the use of the service or feature based on time, hours used, time paid for, etc. without requiring the assistance of an MFCA or an authorization server.

Although the invention herein has been described with reference to particular embodiments, it is to be understood that these embodiments are merely illustrative of the principles and applications of the present invention. For instance, although the mobile devices referenced herein having been described in connection to access associated with a mobile device, it is also intended that feature access may depend on the identity of a user of a mobile device. Therefore, in connection with the identity of the user, access to features and/or services may vary. It is therefore to be understood that numerous modifications may be made to the illustrative embodiments and that other arrangements may be devised without departing from the spirit and scope of the present invention as defined by the appended claims.

What is claimed is:

1. A method of accessing services at a mobile station comprising:
sending, from the mobile station to an owner entity located remote from the mobile station, an authorization code through a wireless network in order to access features of a package of services provided by the owner entity, wherein the wireless network is coupled to an asynchronous transfer mode (ATM) network;
receiving an indication that the owner entity granted access to the features via an authorization server located remote from the mobile station; and
accessing the features by a feature control daemon coupled to the mobile station, wherein the features are provided via the ATM network.

2. A method of accessing services as recited in claim 1 wherein the features are accessed without routing through a mobile switching center (MSC) under a proprietary ownership of another entity.

3. A method as recited in claim 2 wherein the features are accessed using 802.11 connections.

4. A method as recited in claim 2 wherein the proprietary ownership comprises ownership through being an affiliate, subsidiary, or division of said another entity.

5. A method of accessing services as recited in claim 1 wherein the features are selected from a group consisting of ring back tones, three-way calling, call waiting, voice mail, text messaging or a combination thereof.

6. A method of accessing services as recited in claim 1 wherein the features and the package of services comprise features and services that are not directly tied to phone calls.

7. A mobile communications system comprising:
a wireless communications network:
an asynchronous transfer mode (ATM) network coupled to said wireless communications network;
an authorization device connected to said ATM network, wherein said authorization device is configured to provide authorization for use of at least one feature of a package of services provided by an owner entity based on directives from the owner entity;
a mobile communication terminal located remote from the owner entity and comprising a feature control daemon configured to authorize access to the at least one feature based on the provided authorization from the authorization device; and
said at least one feature provided by said ATM network, accessible through said authorization device and selected by the owner entity.

8. A mobile communications system as recited in claim 7 wherein said wireless communications network is coupled to a plurality of mobile communications terminals.

9. A system as recited in claim 8 wherein a set of authorized users of said mobile communications terminals are able to access the at least one feature without communications routing through a mobile switching center (MSC) under a proprietary ownership of another entity.

10. A system as recited in claim 9 wherein said proprietary ownership comprises ownership through being an affiliate, subsidiary, or division of said another entity.

11. A system as recited in claim 7 wherein said at least one feature is selected from a group consisting of ring back tones, three-way calling, call waiting, voice mail, text messaging, other features or a combination thereof.

12. A system as recited in claim 7 wherein said asynchronous transfer mode (ATM) network comprises a plurality of routers connected together through the Internet.

13. A system as recited in claim 7 wherein said asynchronous transfer mode (ATM) network is connected within a packet switched data network.

14. A system as recited in claim 7 wherein said asynchronous transfer mode (ATM) network is connected within a data switched data network.

15. A system as recited in claim 7 wherein said wireless communications network consists of a network selected from CDMA, WCDMA, UMTS, GSM, 802.11, BT, TDMA, or OFDMA networks.

16. A system as recited in claim 7 wherein said authorization device provides authorization for use of the at least one feature in connection with criteria controlled by the owner entity and selected from a current location of the mobile communication terminal, a time of day, specific end user rights, download of data, scripts executables source code or a combination thereof.

17. A method of authorizing a set of features, comprising:
receiving, via a wireless network coupled to an asynchronous transfer mode (ATM) network, an authorization request from a mobile station for access to the set of features, at an authorization server associated with an owner entity located remote from the mobile station, wherein the set of features is provided by the owner entity;
determining, by the authorization server, to allow access to the set of features based on at least one of, a mobile station user, a mobile station location, or time; and
sending an indication of the determination to the mobile station, wherein a feature control daemon of the mobile station accesses the set of features via the ATM network.

* * * * *